United States Patent [19]

Beeston

[11] 4,065,967
[45] Jan. 3, 1978

[54] SILO LEVEL INDICATING SYSTEM

[75] Inventor: John T. Beeston, Des Moines, Iowa

[73] Assignees: Robert E. Kirkpatrick, Humboldt, Iowa; Curtis C. Weaver, Polo, Ill.

[21] Appl. No.: 709,765

[22] Filed: July 29, 1976

[51] Int. Cl.² ............................................. G01F 23/22
[52] U.S. Cl. ..................................... 73/295; 340/246
[58] Field of Search ............................ 73/295, 362.4; 340/244 R, 246

[56] References Cited

U.S. PATENT DOCUMENTS

| 2,753,713 | 7/1956 | Mabey | 73/295 X |
| 2,766,406 | 10/1956 | Schwarzkopf | 73/295 X |
| 2,846,884 | 8/1958 | Daly | 73/362.4 |
| 3,740,740 | 6/1973 | Milo | 73/295 |
| 3,983,751 | 10/1976 | Cipriano | 73/295 |
| 3,995,416 | 5/1976 | Waiwood | 73/295 |

FOREIGN PATENT DOCUMENTS 271,875  11/1927  United Kingdom .................. 73/295

Primary Examiner—Daniel M. Yasich
Attorney, Agent, or Firm—Rudolph L. Lowell

[57] ABSTRACT

The silo level indicating system includes a plurality of temperature indicating sensor units placed on the outside wall of a silo at vertically spaced positions. Each sensor unit and an adjacent portion of the surrounding sidewall is thermally insulated from the atmosphere so that a sensor unit is responsive to the temperature on the inside of the silo at the thermally insulated wall portion. The air within the silo above the level of material is at the same temperature. Thus, in a comparison of the temperature within the silo opposite each sensor unit to that of a reference sensor unit situated at the top of the silo, so as to be above the uppermost level of the material in the silo, a temperature differential between the reference sensor unit and a compared sensor unit indicates the presence of material at or above the compared sensor unit.

9 Claims, 4 Drawing Figures

U.S. Patent     Jan. 3, 1978     4,065,967
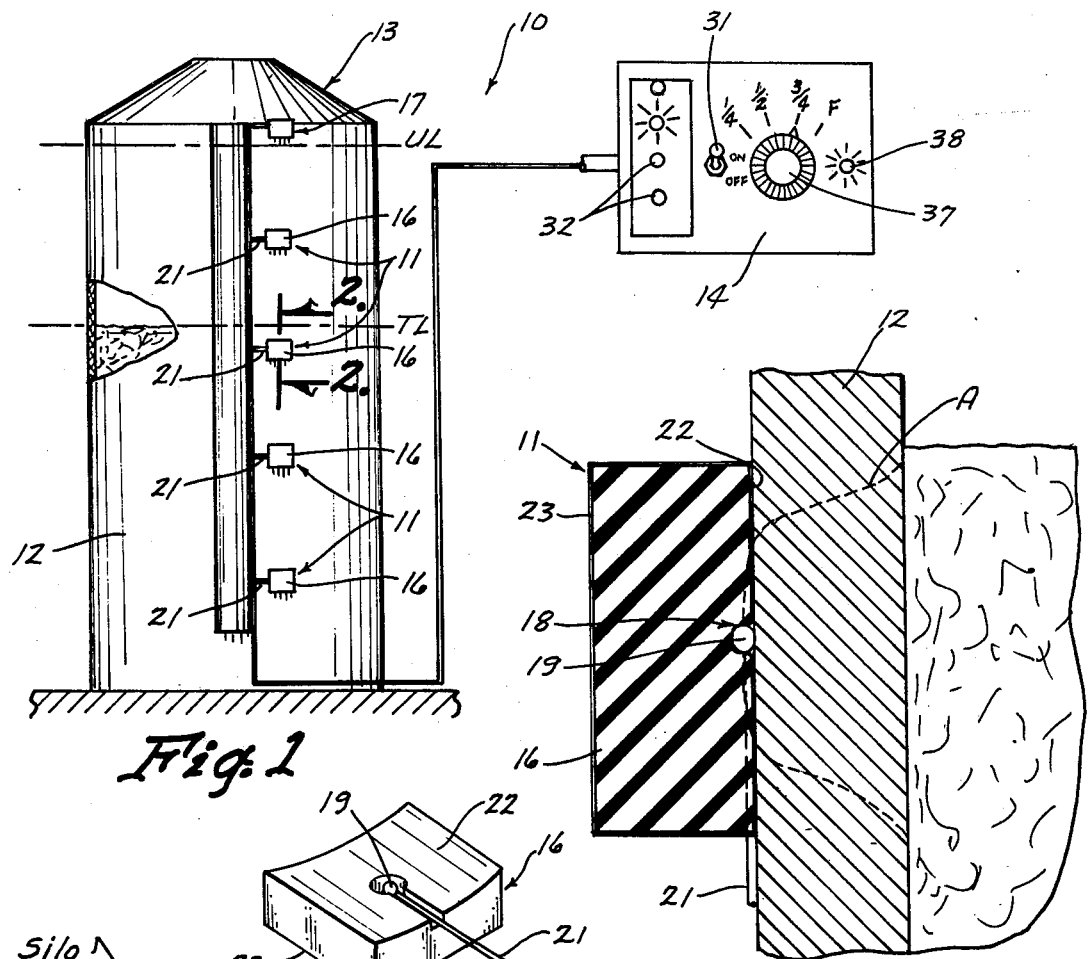
Fig. 1
Fig. 2
Fig. 3
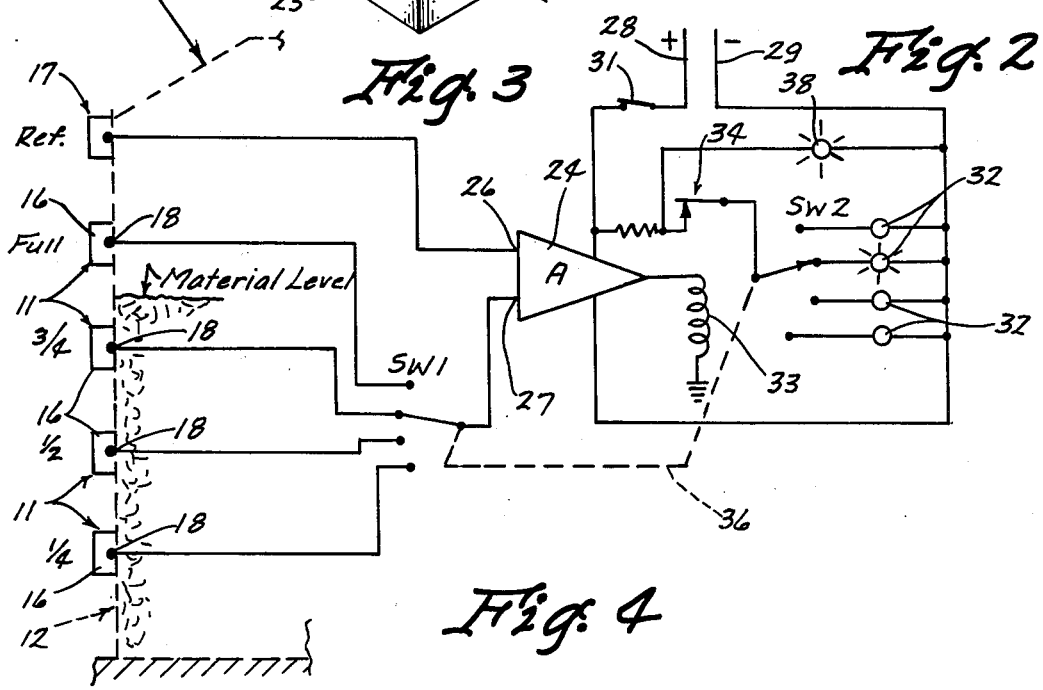
Fig. 4

SILO LEVEL INDICATING SYSTEM

SUMMARY OF THE INVENTION

The silo level indicating system is simple in construction and easily installed to readily provide an external indication of the level of material in a silo or like container. Because the level of material is determined by externally located sensor units operatively associated to selectively indicate temperature differentials existing within the silo, no physical contact occurs between the sensor units and the material. As a result, there is no interference or obstruction to the downward movement of the material in the silo and damage to the indicating system by corrosion or acids in the material is completely eliminated. Additionally, the indicating system can be installed at any time since it is not necessary to empty the silo prior to installation. The thermal insulation of the temperature sensor units from the atmosphere eliminates the effect thereon of ambient temperatures so that the sensor units are directly responsive to the temperatures within the silo at the respective levels of the sensor units.

BRIEF DESCRIPTION OF THE DRAWINGS

FIG. 1 is a diagrammatic illustration of the material level indicating system of the present invention shown in assembly relation with a usual farm silo.

FIG. 2 is an enlarged sectional view of a temperature sensing unit as seen on line 2—2 in FIG. 1;

FIG. 3 is a perspective view of a temperature sensing unit; and

FIG. 4 is a schematic wiring diagram for the material level indicating system of FIG. 1.

DETAILED DESCRIPTION OF THE INVENTION

The silo level indicating system of the present invention, designated generally as 10 in FIG. 1, includes a plurality of temperature sensor units 11 mounted at vertically spaced positions on the outer surface of the sidewall 12 of a silo 13 with each sensor unit electrically connected to a remote control panel 14. The temperature sensor units 11 are in a heat transfer relation with the outer surface of the silo sidewall 12 and thermally insulated from the atmosphere or outside ambient temperature by respective blocks or housing units 16 composed of a thermal insulating material such as styrofoam. Each sensor unit 11 is thus responsive solely to the temperature within the silo at a position opposite the sensor unit and produces a signal indicative of the temperature at that sensor. These signals are communicated to the remote control panel 14 wherein the signal of a sensor 11 is compared to that of a designated reference or top sensor unit, indicated at 17, to determine whether or not a temperature differential exists between a sensor unit 11 and the reference sensor unit 17. The reference sensor unit 17 is positioned at the top of the silo and above the uppermost level UL (FIG. 1) of material in the silo 13 so as to always indicate the temperature of the air above the material in the silo. The reference sensor 17 thus indicates the temperature in the space or void above any level of the material in the silo, which temperature is the same throughout such space. Thus, the absence of a temperature differential between the reference sensor unit 17 and a compared one of the sensor units 11 indicates that only air is present opposite the compared sensor unit and that the material level is below the level of the compared sensor unit. Conversely, a temperature differential indicates that the compared sensor unit is opposite material within the silo so that the material level is at least as high as the level or height of the compared sensor unit on the silo. By selectively comparing the temperatures at the sensor units 11 with that at the reference sensor unit 17, the level of material in the silo will be determined as being between the sensor unit 11, indicating no temperature differential, and the next adjacent lower sensor unit 11 which indicates a temperature differential.

Since sensor units 11 and 17 are the same, only one of the sensor units is described in detail, with like numbers used to designate like parts.

The temperature measuring element of each sensor unit 11 and 17 is shown in FIG. 2 as being a thermistor 18 which, as is known, comprises an electrical resistor composed of a material having a resistance which varies sharply with the temperature. A thermistor 18 is of a generally spherical shape enclosed within a protective plastic bulb 19. A pair of lead wires 21 connect each termistor to an electric circuit within the remote control panel 14.

A thermal insulation block 16 supports the thermistor 18 in heat transfer relation with the silo sidewall 12 as shown in FIG. 2 and also thermally insulates the thermistor from the ambient or outside temperature. Referring to FIG. 3, an inner silo engaging surface 22 of the block 16 has a cavity formed therein to receive the thermistor bulb 19 and lead wires 21. A suitable adhesive such as silicone rubber cement is applied along the periphery of the inner surface 22 to fasten the assembled sensor unit 11 or 17 to the sidewall 12. To reduce air leakage between the outer surface of sidewall 12 and block 16, the inner surface 22 of the block is curved inwardly along a radius equal to that of the silo sidewall 12 so that the surfaces conform to one another.

The insulative effect of block 16 is dependent both on its thickness and area but generally it should cover a large enough area to allow the temperature at the inside of the silo to penetrate to the outside of the silo to the termistor 18, as indicated by line A in FIG. 2. In this manner, the temperature inside of the silo can be measured from the outside surface of sidewall 12.

Whereas insulation block 30 may be composed of any suitable thermally insulative material, a two inch block one foot square formed of styrene has been found to perform satisfactorily. A somewhat thinner block of polyurethane would likewise be suitable although the latter must be shielded from ultraviolet rays to prevent deterioration. Regardless of the particular material used, it is desirable to apply a hard protective coating such as an epoxy layer 23 over the insulation block to protect it from birds, animals and the elements.

In operation, to determine the level within the silo 13, the temperature at the reference sensor unit 17 is first compared with that at one of the other sensor units 11 to determine whether a temperature differential exists between them. This comparison is made by a differential amplifier 24 of the electrical control panel circuit shown in FIG. 4. Accordingly, one input 26 of differential amplifier 24 is electrically connected to the reference sensor 17 and the other input 27 is electrically connected to a selected one of the other sensor units 11 through a selector switch SW1. In order for the sensor units 11 and 17 to produce the signals indicative of their temperature, positive and negative power leads 28 and 29 are electrically connected to the differential amplifier 24 to energize the circuit upon the closing of an "on" "off" switch 31 which is interposed along the positive power lead 28.

In order to visually indicate the difference between the temperatures at the reference sensor unit 17 and the compared sensor unit 11, differential amplifier 24 is effective to complete a circuit to one of the panel indicator lights 32 corresponding to the compared sensor unit 11. The corresponding indicator light 32 is turned on only when a temperature differential exists. Accordingly, when the differential amplifier 24 detects an imbalance between inputs 26 and 27, an output signal is produced which energizes a relay coil 33 to close a normally open relay 34. Thus, a completed electrical connection is made between the positive power lead 28 and the corresponding indicator light 32 through the closed relay 34 and a second selector switch SW2. Selector switches SW1 and SW2 operate in tandem, as indicated by dotted line 36 in FIG. 4, both switches being mounted on the same shaft which is rotated by a single handle 37 on the control panel, as seen in FIG. 1.

Accordingly, with the selector switches SW1 and SW2 positioned as shown in the drawing, to select the sensor unit designated ¾ in FIG. 4 for comparison with the reference sensor unit 17, a temperature differential will be detected thereby lighting the corresponding indicator light 32. This is because the temperature sensor designated ¾ is below the material level in the silo and thereby takes on the temperature of the material which will be either warmer or cooler than that of the air above the material level measured by the reference sensor 17. Accordingly, the resulting electrical resistance of the thermistor 18 of the ¾ sensor unit is different than that of the reference sensor unit 17, thereby causing an imbalance in the differential amplifier 24 which responds by energizing relay coil 33 to close relay 34 and thus light the corresponding indicator light 32.

By rotating handle 37 on the control panel 14 to the settings corresponding to selected ones of the other sensor units 11, it will be discovered that the indicator light 32 corresponding to the sensor unit designated "full" does not light up, thereby indicating the actual level of material in the silo to be between the levels of the "Full" and "¾" temperature sensors 11. The presence of a temperature differential at additional levels of the silo may be determined by adding more sensor units 11.

The level indicating system of the present invention does not depend on temperature measurement per se but rather on the indication of a difference in temperature between a designated reference sensor unit 17 and a selected one of the other vertically spaced sensor units 11. This is because the temperature of the body of material within the silo changes at a different rate than does the air above it in response to changes in the outside ambient temperature. For example, as the morning sun warms the outside ambient temperature, the air within the silo will respond to a greater degree than the temperature of the material which will remain cooler. Conversely, as the ambient temperature is cooled at the end of the day, the body of material retains the heat which it absorbed earlier in the day, thereby remaining warmer than the air above it. Regardless of the time of day, the level indicating system of the present invention makes no distinction as to which temperature is higher but only indicates the existence of a temperature differential between the reference sensor unit 17 and a compared sensor unit 11. This is all that is required to effectively indicate the level of material in the silo.

Approximately twice each day a condition will exist within the silo wherein the temperatures of the air and of the material are the same. If the system is operated at such time, no temperature differential would be found over the full range of sensor units, thereby producing an indication that the silo is empty. To indicate to the operator that the system is operative, although the level of material is unknown, a pilot light 38 is connected between the positive and negative power leads 28 and 29 so as to be on continuously whenever the on-off switch 31 is closed. The operator is thus appraised that his system is operating properly and that he should simply wait a short period of time until the temperatures have adjusted to once again establish a temperature differential. The length of time of the condition of equal temperatures is dependent on the sensitivity of the system. It has been found that the temperature differential between the air and material in a silo is generally about five to six degrees and that effective operation of the level indicator means can be obtained with sensitivity for detecting a one-half degree temperature differential.

From the above description, it is seen that the present invention provides a novel method for indicating the level of material in a silo or like container without contacting the interior of the silo or the material therein. The method includes mounting a plurality of temperature sensors at vertically spaced portions on the outside surface of the sidewall with a designated reference sensor located above the top level of material in the silo. Thermally insulating each sensor from the outside ambient temperature thereby enables the sensors to produce signals indicative of the temperature within the silo at the level of the respective sensors. Comparing the signal from a selected one of the sensors with that of the reference sensor thus indicates whether a temperature differential exists between them. Finally, visually indicating the presence of a temperature differential between the reference sensor and successively selected ones of the other sensors allows an operator to determine the top level of the material in the silo.

Although the invention has been described with respect to a preferred embodiment thereof it is to be understood that it is not to be so limited since changes and modifications can be made therein which are within the full intended scope of this invention as defined by the appended claims.

I claim:

1. A method for indicating the level of material in a silo or the like having an upstanding sidewall, comprising:
   a. mounting a plurality of temperature sensors externally of the silo and in a heat transfer relation with the outside surface of the sidewall at vertically spaced portions thereon including mounting a first one of said sensors above the top level of material in the silo,
   b. a thermal insulation enclosure for thermally insulating each of the sensors and the respective portions of the outside surface of the sidewall from the ambient temperature, whereby the temperature at a sensor outside the silo and the temperature inside the silo opposite the respective wall portion are substantially the same,
   c. producing a reference signal indicative of the temperature at said first sensor and communicating said reference signal to a level indicator means, d. producing a signal indicative of the temperature at a selected one of the other sensors and communicating said signal to the level indicator means, e. comparing said signal with said reference signal in the level indicator means, and f. visually indicating the existence of a temperature difference between the temperatures at said first sensor and said selected sensor.

2. A method for indicating the level of material in a silo or the like, according to claim 1, comprising:

a. producing signals indicative of the temperatures at successively selected ones of the other sensors and successively communicating said signals to the level indicator means, b. successively comparing the respective signals of said successively selected sensors with the reference signal in the level indicator means, and c. successively indicating whether there are differences between the temperatures at said first sensor and said successively selected sensors.

3. A method for indicating the level of material in a silo or the like, according to claim 2, comprising:

a. identifying an uppermost one of said successively selected sensors having a temperature different from that of said first sensor.

4. A method for indicating the level of material in a silo or the like, according to claim 1, comprising:

a. visually indicating the operative condition of the level indicator means when the temperatures of all of the sensors are equal.

5. A method for indicating the level of material in a silo or the like, according to claim 1, comprising:

a. protectively shielding said thermally insulated sensors.

6. A material level indicator for a silo or the like having an upstanding sidewall, comprising:

a. a plurality of temperature sensors, b. means mounting said sensors each in a thermal insulation enclosure externally of the silo and in a heat transfer relation with selected portions of the outside surface of the sidewall at vertically spaced portions thereon for producing signals indicative of the temperature at the respective sensors, with a first one of said sensors located to produce a reference signal indicative of the temperature of the air inside the silo above the material, c. insulator means for thermally insulating each temperature sensor and the respective selected portion of the outside surface of the sidewall, whereby the temperature at a sensor outside of the silo and the temperature inside the silo opposite said respective portion are substantially equal, d. electrical comparator means connected in an electrical circuit with said first sensor to receive the reference signal, e. means for connecting the electrical comparator means to a selected one of the other sensors to receive the respective signal therefrom, f. said electrical comparator means effective to compare said respective signal with the reference signal to produce an output signal indicative of any difference between the temperature at said selected sensor and the temperature at said first sensor, and g. means energized by said output signal to visually indicate the existence of a temperature difference.

7. A material level indicator, according to claim 6, wherein:

a. said insulator means comprises a body of thermally insulative material having a silo engaging surface, a recess formed in said silo engaging surface for receiving said temperature sensor, and means for fastening said body of thermally insulative material to said sidewall.

8. A material level indicator, according to claim 7, wherein:

a. the sidewall is generally cylindrical, and b. said silo engaging surface of the insulator means is curved inwardly to conform with said outside surface of the sidewall.

9. A material level indicator, according to claim 6, wherein:

a. said means actuated by said output signal comprises an array of lights, each light corresponding to a respective sensor, and b. means automatically electrically connecting a corresponding light with the electrical comparator means in response to the connection of said respective sensor with the electrical comparator means.

* * * * *